Aug. 15, 1933.　　J. G. BOUSLOG　　1,922,024
TUBING HEAD
Filed Jan. 14, 1933　　2 Sheets-Sheet 1
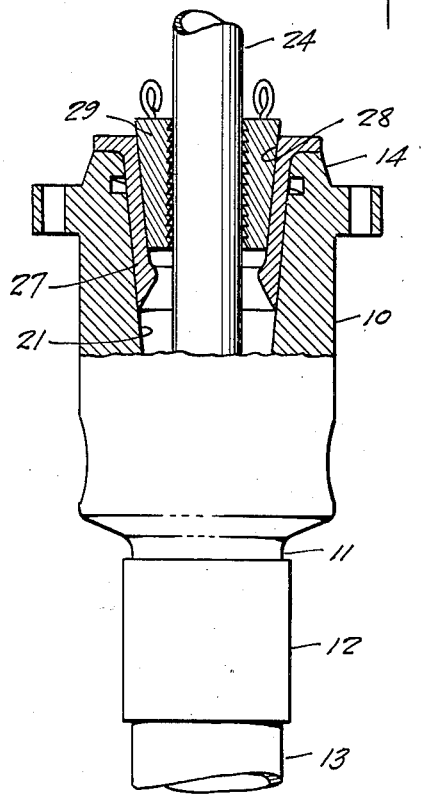
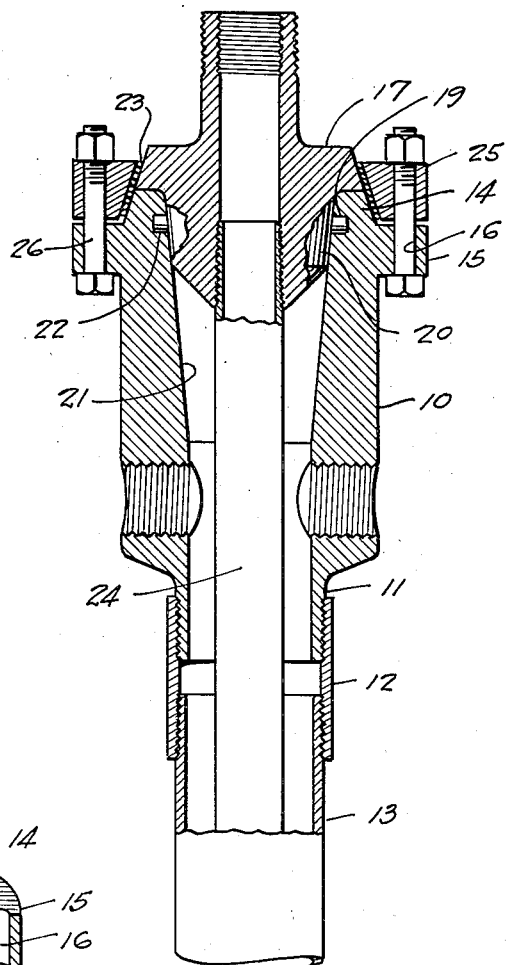
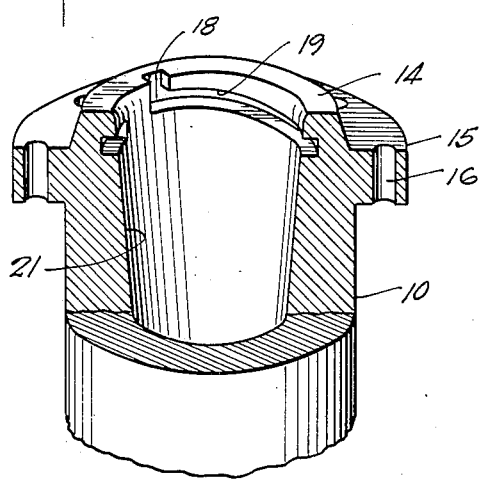
INVENTOR
John G. Bouslog
BY Ernest L. Wallace
ATTORNEY Aug. 15, 1933. J. G. BOUSLOG 1,922,024
TUBING HEAD
Filed Jan. 14, 1933    2 Sheets-Sheet 2

INVENTOR
John G. Bouslog
BY Ernest L. Wallace
ATTORNEY

Patented Aug. 15, 1933

1,922,024

UNITED STATES PATENT OFFICE 1,922,024

TUBING HEAD

John G. Bouslog, Compton, Calif.

Application January 14, 1933. Serial No. 651,747

5 Claims. (Cl. 285—22)

This invention relates to a tubing head for mounting on casing and adapted for connection to tubular strings such as oil tubing. Tubing heads should be constructed in such a manner that the oil tubing may be sealed off effectively for high or low pressures and the oil tubing may be supported by slips during certain operations in the well, such as pulling the tubing out of the hole, cleaning out and other well known operations.

In boring deep wells, it is common practice to line the well hole with casing and to employ casing of comparatively large diameter in the upper portion of the hole to land the casing, cement off, then to reduce the bore of the well hole at greater depth and insert smaller casing within the larger. Casing heads are attached to the casing and form continuation of the strings of smaller casing and at the top a tubing head is mounted on the casing and connected to the oil tubing. A feature of this invention is the provision of a tubing head for oil tubing wherein a gasket may be employed and located so as to be replaceable without disturbing the tubing.

These objects together with other objects will be apparent from the following description and accompanying drawings in which:—

Figure 4:
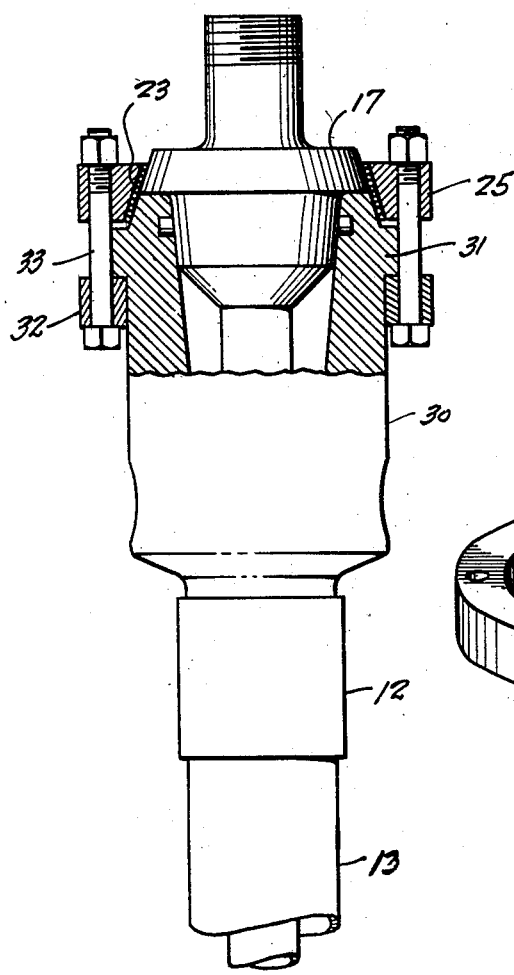
Figure 5:
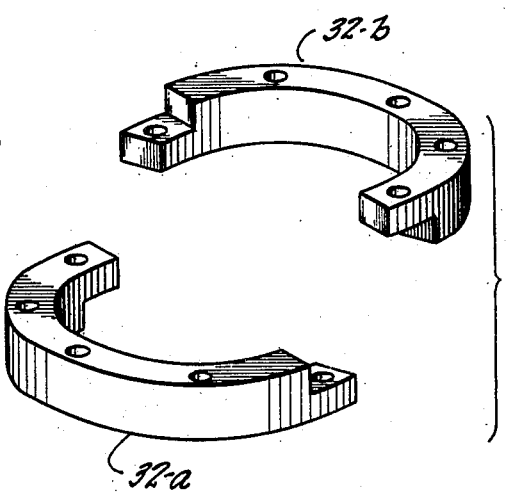

Fig. 1 is a longitudinal section of the upper end of a casing with a tubing head; Fig. 2 is an elevation partly in section showing the tubing head with a tubular mandrel for slips to hold the oil tubing; Fig. 3 is a perspective view partly in section showing a fragment of the tubing head body; Fig. 4 is a view partly in elevation and partly in section showing a modified form of the head employing a segmental clamping ring; and Fig. 5 is a perspective view of the segmental clamping ring disassembled.

Referring more particularly to the drawings and especially Figs. 1 and 3, the tubing head comprises a body 10 having an externally threaded extension 11 at its lower end to which a coupling collar 12 may be attached for mounting on a casing 13. At the upper end of the body 10 is an extension boss 14 provided with a tapered outer surface. Below the boss 14 is an outstanding flange 15 having bolt holes 16. The bore of the body is tapered converging toward the bottom and a mandrel head 17 is shown inserted therein. The body 10 has a bayonet joint coupling which includes longitudinal branch slots 18 and circumferentially ranging branches 19 in the nature of threads. The mandrel head 17 is externally tapered to provide a shoe 20 which seats in the tapered bore 21. Lugs 22 are provided on the tubing head, which lugs are received in the recesses 18 and 19. The mandrel head 10 is enlarged at the top to overlie the upper end of boss 14, and the outer wall of the enlargement forms in conjunction with the outer wall of the boss a tapered wall for mounting thereon a gasket 23. This gasket may be of lead or any other suitable material. The bore of the mandrel head is internally threaded at its lower end to receive oil tubing 24 and is threaded externally and internally at its upper end for attaching tubing thereto. A gland ring 25 is disposed to fit over the gasket 23 and has a bore conforming in shape to the surface of the boss 14 and the outer tapered surface of head 17. Bolts 26 may be inserted through bolt holes 16 in the flange 15 of the body and corresponding bolt holes in the gland ring 25 to securely clamp the gasket and provide a leak tight joint. The arrangement is such that the tubing is supported by the tubing head on the body and the sealing gasket 23 is tightly held in place by the gland ring. The gasket may be replaced without disturbing the tubing as the gland ring may be removed from its seat on the gasket.

Referring to Fig. 2, the tubing head is shown as before with a tubular mandrel head 27 replacing the tubing head 17 before described. The bore of the mandrel head is tapered as indicated by 28 for the reception of slips 29 which engage the oil tubing 24. Thus the tubing head may be used with slips to support the tubing during insertion, removal and other operations in the well hole.

It may happen that the tubing head is being used as a pumping head and the pressure in the well may rise necessitating packing. A convenient means of applying the packing is shown in Figs. 4 and 5. The tubing head body 30 has a flange 31 which merely serves as a shoulder and is of less diameter than flange 15. Below the flange 31 which in this instance is not of as great an extent as the flange 15 and has no bolt holes is a segmental packing ring comprising sections 32a and 32b, the entire ring being designated by the reference numeral 32 in Fig. 4. These segments 32a and 32b may be slipped around the body in assembled relation and bolts 33 passed through the gland ring 25 and corresponding bolt holes in the segmental ring 32 to securely lock the parts together with the gasket 23 in place and pack off the head.

What I claim is:—

1. A tubing head comprising a body with a bore, said body being adapted to be attached to the upper end of casing and having an outwardly extending flange at its upper end, a tapered extension boss on said body above said flange, a mandrel head inserted in the bore of said body and overhanging the upper end of the latter, there being a bayonet joint coupling between said body and mandrel head, said mandrel head and boss meeting to form an external upwardly and inwardly inclined annular shoulder, a gland ring having a bore corresponding to said shoulder and overlying said flange, a gasket disposed between the opposing faces of said ring and boss, a segmentally split clamping ring below said flange, and bolts passing between said rings to clamp the latter to said body.

2. A tubing head comprising a body with a bore, said body being adapted to be attached to the upper end of casing and having an outwardly extending flange at its upper end, a tapered extension boss on said body above said flange, a mandrel head inserted in the bore of said body and overhanging the upper end of the latter, said mandrel head and boss meeting to form an external upwardly and inwardly inclined annular shoulder, a gland ring having a bore corresponding to said shoulder and overlying said flange, a gasket disposed between the opposing faces of said ring and boss, a segmentally split clamping ring below said flange, and bolts passing between said rings to clamp the latter to said body.

3. A tubing head comprising a body with a bore having a conical seat, said body being adapted to be attached to the upper end of casing and having an outwardly extending flange at its upper end, a tapered extension boss on said body above said flange, a mandrel head having a conical end inserted in the bore of said body and overhanging the upper end of the latter, said mandrel head and boss meeting to form an external upwardly and inwardly inclined annular shoulder, a gland ring having a bore corresponding to said shoulder and overlying said flange, a gasket disposed between the opposing faces of said ring and boss, a segmentally split clamping ring below said flange, and bolts passing between said rings to clamp the latter to said body.

4. A tubing head comprising a body adapted to be attached to the upper end of a casing, said body having an outwardly extending flange at its upper end and a tapered extension boss above said flange, a mandrel head inserted in the bore of said body and overhanging the upper end of the latter, there being a bayonet joint coupling between said body and tubing head, said tubing head and boss meeting to form an external upwardly and inwardly inclined annular shoulder, a gland ring having a bore corresponding to said shoulder and overlying said flange, a gasket disposed between the opposing faces of said ring and boss and bolts securing said ring to said body at its flange.

5. A tubing head comprising a body adapted to be attached to the upper end of casing, said body having an outwardly extending flange at its upper end and a tapered extension boss above said flange, a mandrel head inserted in the bore of said body and overhanging the upper end of the latter, said mandrel head and boss meeting to form an external upwardly and inwardly inclined annular shoulder, a gland ring having a bore corresponding to said shoulder and overlying said flange, a gasket disposed between the opposing faces of said ring and boss and bolts securing said ring to said body at its flange.

JOHN G. BOUSLOG.